Patented July 12, 1938

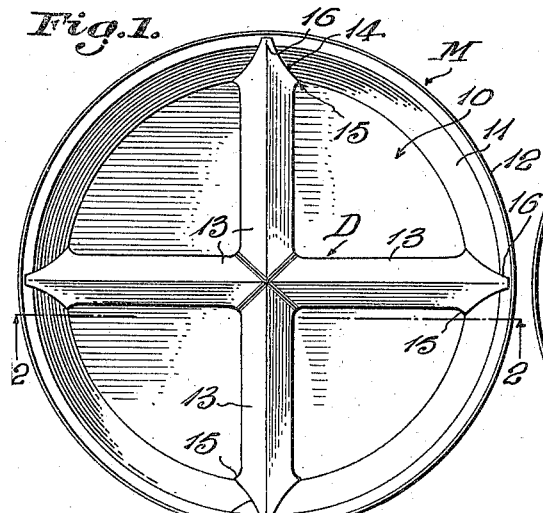

2,123,359

UNITED STATES PATENT OFFICE 2,123,359

PIEPAN

Ethel O. Hallmark, Pasadena, Calif.

Application July 8, 1937, Serial No. 152,634

2 Claims. (Cl. 53—6)

The invention relates to improvements in pie pans of the general type designed for baking pies in segments, and it aims to provide a new and improved construction which may be easily and inexpensively manufactured from metal stampings without the necessity of excessively drawing the metal with danger of weakening it or producing an unsightly article.

In carrying out the above end, the pan is formed from two separate stampings, one comprising a bottom and an upstanding side wall, and the other comprising a divider consisting of rigidly joined radial arms, said arms being adapted to rest upon said bottom and to abut said side wall. The arms of the divider are hollow, and a further object is to make novel provision for conducting heat into these hollow arms to insure effective baking of the edges of the segmental pieces of pie. In carrying out this end, the side wall and/or bottom of the one section are/is formed with apertures for conducting the heat to the interiors of the divider arms, and a further object is to provide means for holding the divider against such turning as would move its arms out of communication with the heat-conducting apertures.

With the foregoing in view, the invention resides in the novel subject matter hereinafter described and claimed, description being accomplished by reference to the accompanying drawing.

Fig. 1 is a top plan view of a complete pie pan constructed in accordance with the invention.

Fig. 2 is a vertical sectional view on line 2—2 of Fig. 1.

Fig. 3 is a top plan view of the main section of the pan.

Fig. 4 is a top plan view of the divider.

Fig. 5 is an edge view of the main section of the pan.

Fig. 6 is a top plan view of the main section showing a variation in construction.

Fig. 7 is an edge view of the pan section shown in Fig. 6.

The main section M of the pan consists of a flat bottom 10 having an upstanding side wall 11 formed integrally therewith, said side wall 11 being inclined from its lower edge substantially to its upper edge but having its upper edge portion 12 offset outwardly and of substantially right-angular cross section.

The divider D consists of a plurality of radial arms 13 integrally joined to each other and of hollow construction, each arm being preferably of the arched cross section shown in Fig. 2. These arms 13 are intended to rest solidly upon the flat bottom 10 and the outer ends 14 of said arms are beveled to lie against the inclined side wall 11, the metal at said ends being preferably curved laterally to a slight extent as indicated at 15 to provide fillets in the corners between the arms and the side wall 11. At their upper extremities, the outer ends of the arms are preferably provided with projections 16 to lie upon the side wall formation 12.

In the present disclosure, both the bottom 10 and the side wall 11 are apertured to conduct heat into the interiors of the arms 13 to insure thorough baking of the edges of the pie segments contacting with said arms. In most figures of the drawing, the apertures in the bottom 10 and side wall 11 are formed by a plurality of perforations 17 which may be of any desired size and shape. In Figs. 6 and 7, however, radial slots 18 are formed in the bottom 10 and triangular openings 19 are formed in the side wall 11. In either instance, heat will be effectively conducted to the interiors of the divider arms 13.

To prevent turning of the divider D out of communication with the perforations 17 or the slots and openings 18 and 19, I provide the pie pan 10 with narrow ridges 20 which are straddled by the arched formations of said arms.

By following the novel construction herein disclosed, a pie pan may be produced easily and inexpensively from two sheet metal stampings, without the necessity of drawing or otherwise distorting the metal so seriously as to weaken any parts of the pan or detract from its appearance. Furthermore, the pan will be highly efficient and desirable and as the two sections M and D are readily separable, they may be much more readily cleaned and dried than if they were attached to each other. The general construction shown and described, is preferably followed, but within the scope of the invention as claimed, variations may be made. In this regard, it will be obvious that while a divider having four arms is shown, it might well have any other desired number of arms, it being of course understood that a change in such number would necessitate a corresponding change in the apertured portions of the main section M.

I claim:

1. A pie pan comprising a bottom having an upstanding side wall, a divider free of attachment to and resting removably on said bottom, said divider consisting of rigidly joined radial arms whose outer ends abut said side wall, said arms being hollow and being open at their outer ends and at their lower sides, said bottom being provided with apertures under said arms communicating with the interiors of the latter, said side wall being provided with apertures at the outer ends of said arms and communicating with the interiors of the latter, all of said apertures serving to conduct heat into said arms, and means for holding said divider against turning out of communication with said apertures without interfering with removal of said divider.

2. A pie pan comprising a bottom having an upstanding side wall, a divider free of attachment to and resting removably on said bottom, said divider consisting of rigidly joined radial arms whose outer ends abut said side wall, said arms being of arched cross-section, and pairs of upstanding ribs on said bottom, said pairs of ribs extending longitudinally of said arms respectively, and being straddled thereby to prevent turning of said divider in the pan, the portions of the pan bottom between the ribs of each pair being apertured to conduct heat into said arms.

ETHEL O. HALLMARK.